(12) United States Patent
Fleig et al.

(10) Patent No.: US 11,391,285 B2
(45) Date of Patent: Jul. 19, 2022

(54) BLOCKING DEVICE OF A FAN

(71) Applicant: ebm-papst St. Georgen GmbH & Co. KG, St. Georgen (DE)

(72) Inventors: Armin Fleig, St. Georgen (DE); Gunter Langeneck, Villingen-Schwenningen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 36 days.

(21) Appl. No.: 17/043,914

(22) PCT Filed: May 16, 2019

(86) PCT No.: PCT/EP2019/062629
§ 371 (c)(1),
(2) Date: Sep. 30, 2020

(87) PCT Pub. No.: WO2019/238353
PCT Pub. Date: Dec. 19, 2019

(65) Prior Publication Data
US 2021/0018007 A1    Jan. 21, 2021

(30) Foreign Application Priority Data

Jun. 11, 2018    (DE) ..................... 10 2018 113 869.5

(51) Int. Cl.
*F04D 25/06*    (2006.01)
*F04D 29/056*    (2006.01)
*F16D 41/02*    (2006.01)

(52) U.S. Cl.
CPC ........... *F04D 25/06* (2013.01); *F04D 29/056* (2013.01); *F16D 41/02* (2013.01); *F05D 2260/40* (2013.01); *F05D 2260/90* (2013.01)

(58) Field of Classification Search
CPC .... F04D 25/06; F04D 29/056; F04D 25/0613; F04D 25/022; F16D 41/02; F05D 2260/40; F05D 2260/90
See application file for complete search history.

(56) References Cited

U.S. PATENT DOCUMENTS 3,262,369 A * 7/1966 Piotrowski ............ B23B 31/266
409/233
6,183,368 B1    2/2001 King et al.
(Continued)

FOREIGN PATENT DOCUMENTS

DE    8913924 U1    1/1990
EP    1460273 A1 *  9/2004  ........... F04D 27/008

OTHER PUBLICATIONS

International Search Report and Written Opinion of the International Searching Authority, issued in PCT/EP2019/062629, dated Aug. 9, 2019; ISA/EP.

*Primary Examiner* — Jacob M Amick
*Assistant Examiner* — Charles J Brauch
(74) *Attorney, Agent, or Firm* — Harness, Dickey & Pierce, P.L.C.

(57) ABSTRACT

A blocking device (1) for a fan that blocks a direction of rotation of a rotor (70), via which a wheel of the fan can be driven. The blocking device has a bearing tube (10), a rotor shaft (60) and a freewheel sleeve (50). The freewheel sleeve (50) is accommodated in the bearing tube (10) and is connected to the rotor shaft (60), which extends through the freewheel sleeve (50), for conjoint rotation. The freewheel sleeve (50) blocks rotation of the rotor shaft (60) at least in relation to the bearing tube (10) in the direction of rotation of the rotor.

14 Claims, 2 Drawing Sheets

(56) References Cited

U.S. PATENT DOCUMENTS

2009/0185907 A1* 7/2009 Yoo .................. F04D 25/02
                                                416/204 R
2018/0044008 A1* 2/2018 Bammer ............ B64C 27/04

* cited by examiner

BLOCKING DEVICE OF A FAN

CROSS-REFERENCE TO RELATED APPLICATIONS

This application is a 371 U.S. National Phase of International Application No. PCT/EP2019/062629, filed May 16, 2019, which claims priority to German Patent Application No. 10 2018 113 869.5, filed Jun. 11, 2018. The entire disclosures of the above applications are incorporated herein by reference.

FIELD

The disclosure relates to a fan blocking device that blocks a direction of rotation of a rotor, that drives a fan wheel of the fan.

BACKGROUND

Various fans that can be driven by a motor are already known from the prior art. The motors or the output shafts of the motors, connected to the rotor, are connected to a fan wheel. Thus, the fan wheels can be rotated by the motors. The fans usually have a predetermined first direction of rotation. Thus, the fan wheel is actively driven and an air flow is generated. If such flow is no longer to be generated, the motor is switched off. However, an air flow flowing in the opposite direction of the previously generated flow can result in the fan wheel being rotated passively in a second direction of rotation opposite to the predetermined first direction of rotation. Rotation of the rotor opposite to the predetermined first direction of rotation may, in particular with a sensorless electric motor, result in the motor subsequently not starting or starting with difficulty. Sensorless motors determine the position of the rotor, which is also required for starting. For example, by measuring the stator windings, the position of the magnets of the rotor and thus the position of the rotor is determined. If the rotor rotates opposite to the predetermined first direction of rotation, the correct rotor position cannot be determined or it is complex to determine.

To prevent such passive rotation of the rotor, prior art embodiments provide for the fans to be designed with a mechanical brake. This makes them heavy and expensive. Alternatively, electrical self-locking by the motor is also known. However, this results in a permanent load acting on the motor and the motor electronics. Accordingly, this reduces the service life of these components.

It is an object of the disclosure to overcome the aforementioned disadvantages. The disclosure provides a blocking device where rotation of the rotor opposite to an actively driven direction of rotation can be prevented in an efficient and cost-effective manner.

This object is achieved by a blocking device for a fan that blocks a direction of rotation of a rotor via which a fan wheel of the fan can be driven, comprising: a bearing tube, a rotor shaft and a freewheel sleeve; the freewheel sleeve is accommodated in the bearing tube, the freewheel sleeve is connected to the rotor shaft that extends through the freewheel sleeve, for conjoint rotation; the freewheel sleeve blocks rotation of the rotor shaft at least in relation to the bearing tube in one direction of rotation of the rotor.

According to the disclosure, a fan blocking device is proposed that blocks a direction of rotation of a rotor. A fan wheel of the fan can be driven via the rotor. The blocking device comprises a bearing tube, a rotor shaft and a freewheel sleeve. The freewheel sleeve is accommodated in the bearing tube and connected to the rotor shaft, that extends through the freewheel sleeve, for conjoint rotation. Furthermore, the freewheel sleeve blocks rotation of the rotor shaft at least in relation to the bearing tube in the direction of rotation of the rotor.

The direction of rotation where the rotation of the rotor shaft is blocked by the freewheel sleeve is the second direction of rotation. The second direction is opposite to the predetermined first direction of rotation where a flow is generated by the fan wheel. This enables rotation of the rotor shaft and of the rotor connected to the rotor shaft in the first direction of rotation. It blocks rotation in the second direction of rotation.

Freewheel sleeves are known in the art as coaxial sleeves. They can be rotated relative to one another in one direction of rotation and are locked in the opposite direction of rotation. The direct attachment of the rotor shaft to the freewheel sleeve, that is supported directly or indirectly on the bearing tube, blocks rotation of the rotor shaft in the one direction of rotation. This ensures rotation in the opposite direction of rotation.

In an advantageous further embodiment, the blocking device further comprises a bushing. The bushing is fastened between the freewheel sleeve and the bearing tube. The freewheel sleeve is fixed in the bushing for conjoint rotation. In this embodiment, the bushing limits rotation of the freewheel sleeve in relation to the bearing tube. The bushing also limits rotation of the rotor shaft in relation to the bearing tube by the rotor shaft being accommodated in the freewheel sleeve and the freewheel sleeve being accommodated in the bushing.

Another advantageous embodiment variant provides that the bushing forms a contact surface in the axial direction and for the bearing tube to form an abutment surface. The surfaces face each other. The contact surface of the bushing abuts against the abutment surface of the bearing tube. Thus, the position of the bushing in the bearing tube is fixed in the axial direction.

To enable rotation of the rotor shaft about its axis of rotation in the bearing tube, the rotor shaft is supported on or in the bearing tube by at least one bearing. The bearing can be a radial bearing or a combination of radial and thrust bearings. Preferably, it is designed as a ball bearing. The bearing positions the rotor shaft concentrically to the bearing tube in the bearing tube by placing an outer circumference of the bearing in abutment against an inner wall of the bearing tube and the inner circumference of the bearing in abutment against the rotor shaft. In an embodiment in which the bushing is spaced apart from the bearing tube in the radial direction, the bearing also positions the freewheel sleeve and, if provided, the bushing concentrically to the bearing tube.

In another advantageous embodiment, a spring, in particular a compression spring, is positioned between the bearing and the bushing. The spring abuts directly or indirectly against the bushing and the bearing and presses them apart in the axial direction. For this purpose, a spring contact surface can be formed on the bushing opposite the contact surface of the bushing against which the spring abuts in the axial direction. Within the bearing tube, the spring extends to the bearing and abuts, directly or via an annular disk, against it.

A further embodiment provides that the bearing is fixed in an axial direction. The spring presses the contact surface of the bushing against the abutment surface of the bearing tube.

The position of the bearing is fixed in the axial direction, in relation to the bearing tube, by an inner locking ring on a side facing away from the spring. The position of the bushing in the axial direction is determined by pressing the bushing to the abutment surface of the bearing tube.

Furthermore, an alternative embodiment variant is particularly advantageous where the position of the bearing is fixed in the axial direction, in relation to the rotor shaft, by an outer locking ring on a side facing away from the spring. The spring is supported by the rotor shaft, via the bearing. It presses the bushing against the bearing tube. Thus, the rotor shaft is subjected to a tractive force by the spring in a direction facing from the bushing in the direction of the bearing. The rotor shaft is supported on the bearing tube by a second bearing in an opposite direction, this is pulled into the bearing tube and against an axial stop of the second bearing.

Accordingly, a further advantageous embodiment variant provides that the rotor shaft is supported in the bearing tube by a first and a second bearing. The bearings are spaced apart from each other in the axial direction. They are braced in relation to each other by the spring.

In an advantageous further development, the bearing tube has a recess on the inner wall side and the bushing has an axial head portion. The head portion is formed orthogonal to the axial direction with an asymmetrical cross section. A part of the head portion or the head portion engages the recess of the bearing tube. The contact surface of the bushing is preferably formed on the head portion. The spring contact surface is formed on the head portion on a side opposite the contact surface of the bushing.

The dimension of the recess in the circumferential direction is larger than that of the head portion. Thus, the bushing in the bearing tube can be rotated about the axis of rotation until the head portion comes into contact with a boundary surface of the recess due to the rotation. Thus, the recess and the head portion allow rotation of the bushing in the circumferential direction by a predetermined angle. Rotation of the bushing by the predetermined angle enables the rotor or the fan wheel to be rotated by the predetermined angle despite the freewheel sleeve. For example, screws can thus be made accessible or adjustments can be made to the fan wheel. It is, for example, also possible to allow rotation by the predetermined angle during assembly only and to block it for normal operation by placing an adhesive on the head portion.

Alternatively, the recess of the bearing tube and the head portion of the bushing are formed to fit each other. The fit blocks rotation of the bushing in its circumferential direction since the bushing cannot be rotated in relation to the bearing tube. In particular, a clearance fit can be used as a fit. This means that the head portion does not abut against the recess or the bearing tube.

In an advantageous further development, the bushing is spaced apart from the bearing tube in the radial direction. Thus, the position of the bushing and the freewheel sleeve in the radial direction is dependent on the rotor shaft. The rotor shaft is supported concentrically in the bearing tube by the bearing or bearings. Thus, the position of the rotor shaft is not overdetermined by an additional point of contact via the bushing on the bearing tube.

An alternative embodiment variant provides that the bushing abuts against the bearing tube in the radial direction. However, it is preferably provided that the bearing, where the spring is supported, be accommodated in the bushing.

A further advantageous development of this implementation with an abutting bushing provides for the bushing to be glued with its outer circumferential surface to an inner wall surface of the bearing tube. In addition, the adhesive layer allows the bushing to be aligned in the bearing tube.

To precisely determine the position of the freewheel sleeve in the bearing tube, an advantageous embodiment of the disclosure provides that the freewheel sleeve forms a contact surface in the axial direction and for the bushing to form an abutment surface. The surfaces face each other. The contact surface of the freewheel sleeve abuts against the abutment surface of the bushing. The position of the bushing is determined by its contact surface and the abutment surface of the bearing tube, which, in turn, determines the position or location of the freewheel sleeve in the axial direction in the bearing tube.

The disclosure further comprises a fan with a drive motor. A fan wheel can be driven by the drive motor. A fan blocking device according to the disclosure blocks rotation of the fan wheel in one direction of rotation.

DRAWINGS

The drawings described herein are for illustrative purposes only of selected embodiments and not all possible implementations, and are not intended to limit the scope of the present disclosure.

Other advantageous embodiments of the disclosure are characterized in the dependent claims or are discussed in more detail below together with the description of the preferred embodiment of the disclosure with reference to the figures. In the drawings:

The figures are schematic and provided by way of example. Identical reference numerals in the figures indicate identical functional and/or structural features.

DETAILED DESCRIPTION

Figure 1:
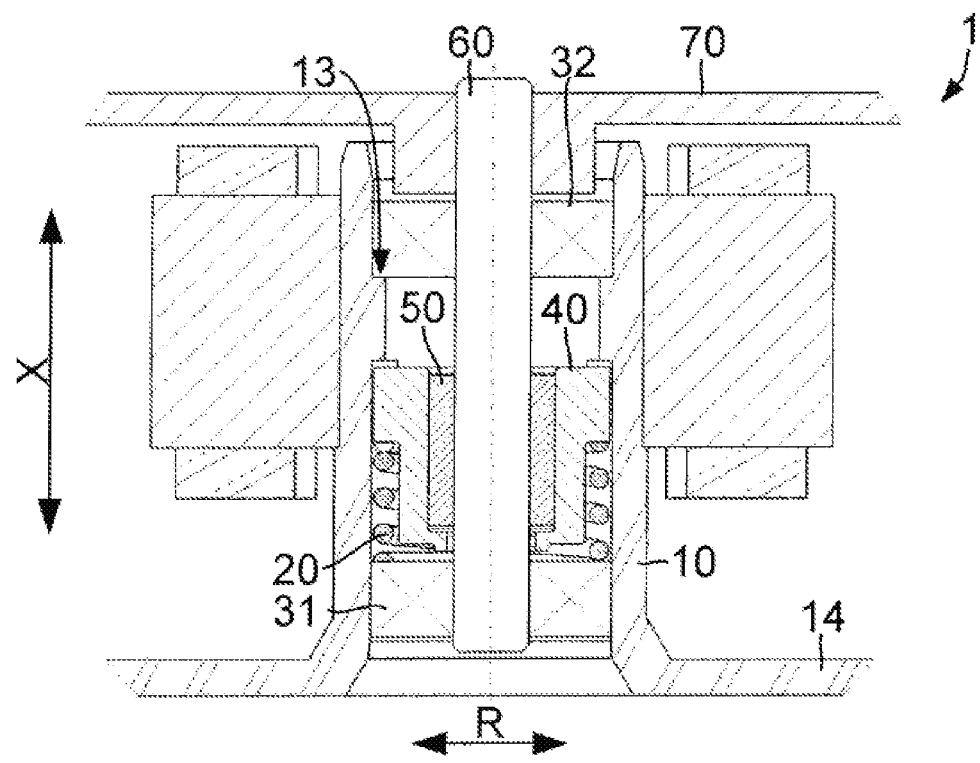
FIG. 1 is a cross sectional view of a first embodiment variant of a blocking device.
Figure 3:
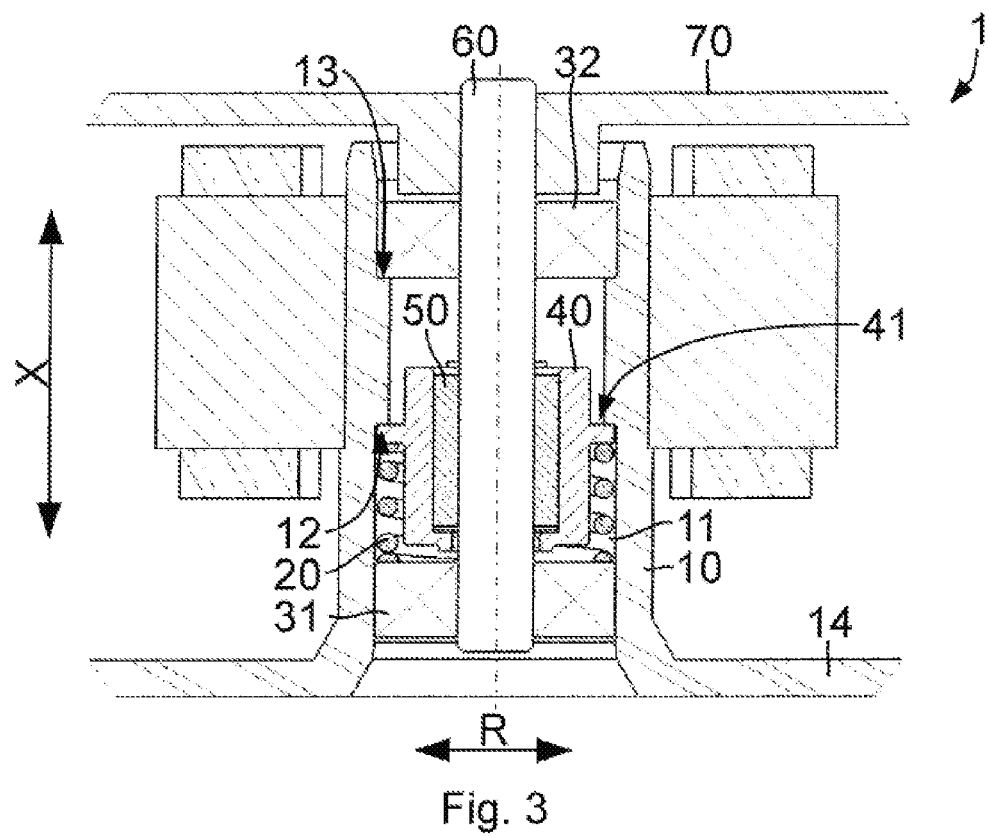
FIG. 3 is a cross sectional view of the blocking device of FIG. 1, rotated by 90° about the axis of rotation.
Figure 4:
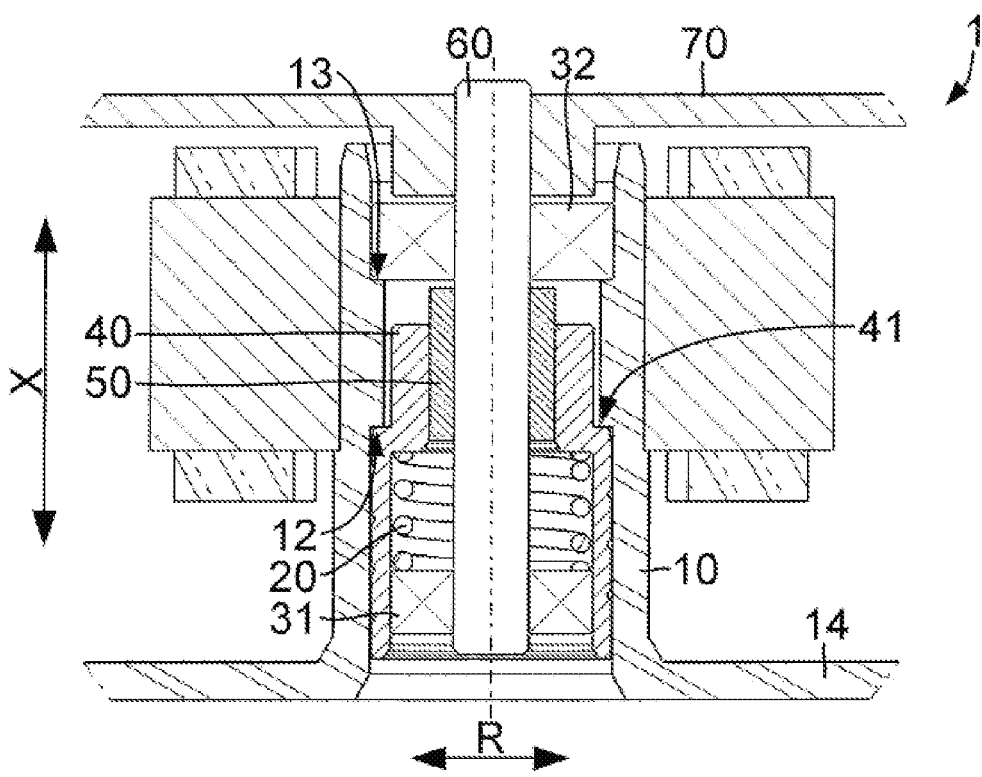
FIG. 4 is a cross sectional view of a second embodiment variant of a blocking device.

In the blocking devices 1, for a fan (not shown), shown in FIGS. 1, 3 and 4, a respective rotor shaft 60 extends along the axis of rotation (shown as a dash-dot line) through a bearing tube 10. The rotor shaft 60 is supported by a bearing arrangement including of a first bearing 31 and a second bearing 32 in relation to the bearing tube 10. A respective freewheel sleeve 50 is positioned about and connected to a portion of the rotor shaft 60 for conjoint rotation. The freewheel sleeve 50 is attached, for example by clamping. A lower side of the bearing tube 10 ends in a flange 14. The flange 14 can be used to fix the respective blocking device 1, for example, to a base plate or a housing. On a side of the rotor shaft 60 facing away from the flange 14, the rotor 70 is connected to the rotor shaft 60 for conjoint rotation. The rotor 70 is supported about the axis of rotation via the bearing arrangement of the rotor shaft 60. Due to the connection of the rotor shaft 60 to the rotor 70, a rotation of the rotor 70 corresponds to a rotation of the rotor shaft 60 and vice versa. The fan wheel, not shown, is driven via the rotor 70.

The freewheel sleeve 50 blocks rotation of the rotor shaft 60, the rotor 70 and thus the fan wheel (not shown) in a direction of rotation about the axis of rotation. In the embodiment shown it is not supported directly on the bearing tube 10 but is accommodated in a bushing 40 placed between the freewheel roller 50 and the bearing tube 10.

FIGS. 1 and 3 show a blocking device 1 in different views. The blocking device 1 of FIG. 3 is rotated by 90° about the rotation axis shown as a dash-dot line compared to the representation in FIG. 1 but shown in section or half-section like the blocking device 1 in FIG. 1. The respective bushing 40 does not abut against the bearing tube 10 in the radial direction R. The position of the rotor shaft 60, the freewheel sleeve 50 positioned on the rotor shaft 60 and the bushing 40 is respectively determined by the bearing arrangement of the rotor shaft 60. Due to the distance between the bushing 40 and the bearing tube 10 a slight rotation of the bushing 40 with the freewheel sleeve 50 and the rotor shaft 60 is possible in both directions of rotation. The rotation is limited by the shape of the bushing 40 and, in particular, the shape of the asymmetrical portion of the bushing 40.

Figure 2:
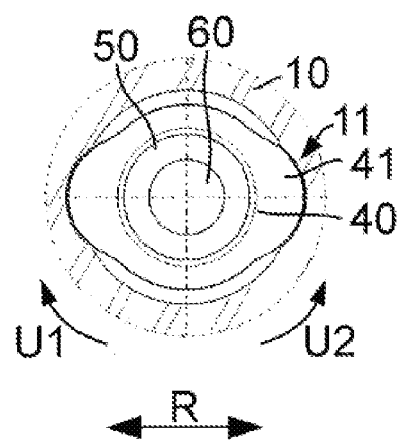
FIG. 2 is a cross sectional view of a section orthogonal to the axis of rotation through the blocking device.

FIG. 2 shows a partial top view of the bushing 40 and the surrounding bearing tube 10. The bushing 40 of FIG. 2 corresponds to the bushing 40 of FIGS. 1 and 3. The bushing 40 has a head portion that is formed in an essentially elliptical shape. The two projections protruding from the round base shape of the bushing 40 form an anti-rotation device. The protrusions engage the recesses 11 of the bearing tube 10, with a small gap remaining between the projections and the bearing tube 10. The bushing 40 is spaced apart from the bearing tube 10 in the radial direction R. The bushing 40 can be rotated about the axis of rotation in the directions of rotation U1 and U2 until the protrusions or at least one protrusion abut/abuts against the bearing tube 10. The direction of rotation U1 corresponds to the predetermined direction of rotation for generating a flow and is not blocked by the freewheel sleeve 50. In the opposite direction of rotation U2, rotation of the rotor shaft 60 with respect to the bushing is locked or blocked by the freewheel sleeve 50. It is also apparent from FIG. 2 that the bearing tube 10, the bushing 40, the freewheel sleeve 50 and the rotor shaft 60 are positioned concentrically to each other.

In the blocking device 1, as shown in FIGS. 1 and 3, the bushing 40 abuts with its contact surface 41 against an abutment surface 12 of the bearing tube 10 facing towards the axial direction X. A spring contact surface, against which the spring 20 abuts, is formed on a side of the bushing 40 situated opposite the contact surface 41. The spring 20 is positioned between the bushing 40 and the first bearing 31. By fixing the first bearing 31 in the axial direction X, for example, by an outer securing ring (not shown) on the rotor shaft 60 on a side of the first bearing 31 facing away from the bushing 40, the bushing 40 or the contact surface 41 of the bushing 40 are pressed against the abutment surface 12 of the bearing tube 10 by the spring 20. At the same time, the spring 20 pushes the first bearing 31 and, with the first bearing 31, the rotor shaft 60 in the direction of the flange 14. However, since the rotor shaft 60 is pressed, via the second bearing 32, against a contact surface 13 of the bearing tube 10 that faces away from the abutment surface 12, the rotor shaft 60 cannot be moved in the direction of the flange 14. Thus, the bearing arrangement or the first and the second bearings 31, 32 are instead braced by the spring 20.

In the embodiment of the blocking device 1 shown in FIG. 4, the first and the second bearings 31, 32 are also braced in relation to each other by the spring 20. The bushing 40 directly abuts against and is glued to the bearing tube 10, at least with a lower portion. The spring 20 and the first bearing 31 are positioned in the bushing 40. Since the bushing 40 is glued to the bearing tube 10, rotation of the bushing in relation to the bearing tube 10 is completely blocked and not only limited.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A blocking device for a fan that blocks a direction of rotation of a rotor, via which a fan wheel of the fan can be driven, comprising:
    a bearing tube, a rotor shaft directly connected to the rotor and a freewheel sleeve;
    the freewheel sleeve is accommodated inside the bearing tube between a pair of bearings; the freewheel sleeve is connected to the rotor shaft, that extends through the freewheel sleeve, for conjoint rotation;
    the freewheel sleeve blocks rotation of the rotor shaft at least in relation to the bearing tube in one direction of rotation of the rotor.

2. The blocking device according to claim 1, further comprising a bushing where the freewheel sleeve is fixed for conjoint rotation therewith, the bushing limits rotation of the freewheel sleeve in relation to the bearing tube.

3. The blocking device according to claim 2 wherein the bushing forms a contact surface in the axial direction and the bearing tube forms an abutment surface facing each other, and the contact surface of the bushing abuts against the abutment surface of the bearing tube.

4. The blocking device according to claim 3, wherein a spring is positioned between one of the bearings and the bushing, which push the bearing and the bushing apart in the axial direction.

5. The blocking device according to claim 4, wherein the bearing is fixed in the axial direction and the spring presses the contact surface of the bushing against the abutment surface of the bearing tube.

6. The blocking device according to claim 4, wherein the rotor shaft is supported in the bearing tube by the pair of bearings that are spaced apart from one another in the axial direction and braced in relation to each other by the spring.

7. The blocking device according to claim 2, wherein the bearing tube has a recess on the inner wall side and the bushing has an axial head portion having an asymmetrical cross section, that engages the recess of the bearing tube.

8. The blocking device according to claim 7, wherein the recess is formed to be larger in the circumferential direction than the head portion of the bushing and allows rotation of the bushing in the circumferential direction by a predetermined angle.

9. The blocking device according to claim 7, wherein the recess of the bearing tube and the head portion of the bushing are formed to fit each other and rotation of the bushing in the circumferential direction is blocked.

10. The blocking device according to claim 2, wherein the bushing is spaced apart from the bearing tube in the radial direction.

11. The blocking device according to claim 2, wherein the bushing abuts against the bearing tube in the radial direction.

12. The blocking device according to claim 2, wherein the bushing is glued with its outer circumferential surface to an inner wall surface of the bearing tube.

13. The blocking device according to claim 2, wherein the freewheel sleeve forms a contact surface in the axial direction and the bushing forms an abutment surface facing each another, and the contact surface of the freewheel sleeve abuts against the abutment surface of the bushing.

14. A fan with a drive motor, a fan wheel driven by the drive motor and a blocking device according to claim 1.

* * * * *